United States Patent
Shetigar et al.

(10) Patent No.: US 9,344,929 B2
(45) Date of Patent: May 17, 2016

(54) FACILITATING AUTOMATIC NEIGHBOR RELATION IN A WIRELESS TELECOMMUNICATION NETWORK ENVIRONMENT

(71) Applicant: CISCO TECHNOLOGY, INC., San Jose, CA (US)

(72) Inventors: Madhur Raj Nagesh Shetigar, Bangalore (IN); Shashank Misra, Bangalore (IN); Sushanth Chandappa Kulal, Mangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 14/223,482

(22) Filed: Mar. 24, 2014

(65) Prior Publication Data

US 2015/0271714 A1    Sep. 24, 2015

(51) Int. Cl.
*H04W 36/00* (2009.01)

(52) U.S. Cl.
CPC .................................. *H04W 36/0061* (2013.01)

(58) Field of Classification Search
None
See application file for complete search history.

(56) References Cited

U.S. PATENT DOCUMENTS

| | | | |
|---|---|---|---|
| 2011/0263282 A1 | 10/2011 | Rune et al. | |
| 2011/0310791 A1* | 12/2011 | Prakash | H04W 24/02 370/315 |
| 2012/0026918 A1 | 2/2012 | Won et al. | |
| 2012/0100884 A1 | 4/2012 | Radulescu et al. | |
| 2012/0188984 A1* | 7/2012 | Takahashi | H04W 36/0083 370/331 |
| 2012/0302240 A1* | 11/2012 | Tamaki | H04W 36/0016 455/436 |
| 2012/0329461 A1* | 12/2012 | Teyeb | H04W 36/0061 455/437 |
| 2014/0274060 A1* | 9/2014 | Fujishiro | H04W 8/14 455/436 |
| 2014/0301371 A1* | 10/2014 | Maeda | H04W 36/0011 370/331 |

FOREIGN PATENT DOCUMENTS

| | | |
|---|---|---|
| EP | 2575391 A1 | 4/2013 |
| WO | 2013066240 | 5/2013 |
| WO | 2013127424 | 9/2013 |

OTHER PUBLICATIONS

"Self-Optimizing Networks: The Benefits of SON in LTE," 4G Americas White Paper, Jul. 2011, 69 pages; http://www.4gamericas.org/documents/Self-Optimizing%20Networks-Benefits%20of%20SON%20in%20LTE-July%202011.pdf.

* cited by examiner

*Primary Examiner* — Sulaiman Nooristany
(74) *Attorney, Agent, or Firm* — Patent Capital Group (57) ABSTRACT

An example method for facilitating automatic neighbor relation in a wireless telecommunication network environment is provided and includes initiating a fake handover with a target Evolved Node B (eNB) in a Long Term Evolution (LTE) wireless network environment over an S1 interface with a mobility management entity (MME), receiving a handover command message from the MME including neighbor cell information associated with the target eNB, canceling the fake handover, and updating a neighbor relations table (NRT) with the neighbor cell information. In various embodiments, the neighbor cell information includes information associated with the target eNB not communicated over an X2 interface, such as system control information communicated in a broadcast control channel. The method may further include receiving a measurement report from a user equipment with information of neighboring cells and initiating the fake handover if any neighboring cell included in the measurement report is missing from the NRT.

16 Claims, 4 Drawing Sheets

FACILITATING AUTOMATIC NEIGHBOR RELATION IN A WIRELESS TELECOMMUNICATION NETWORK ENVIRONMENT

TECHNICAL FIELD

This disclosure relates in general to the field of communications and, more particularly, to facilitating automatic neighbor relation (ANR) in a wireless telecommunication network environment.

BACKGROUND

Long Term Evolution (LTE), marketed as 4G LTE, is a standard for wireless communication of high-speed data for mobile phones and data terminals based on the Global System for Mobile Communications (GSM)/Enhanced Data rates for GSM Evolution (EDGE) and Universal Mobile Telecommunications System (UMTS)/High Speed Packet Access (HSPA) network technologies. The LTE and related standards are developed by 3rd Generation Partnership Project (3GPP). LTE uses Evolved Universal Terrestrial Radio Access Network (E-UTRAN) radio access network standard for LTE's air interface system. The 3GPP infrastructure provides wired or wireless connections among communicating intermediate stations, called E-UTRAN nodeBs or Evolved Node Bs (eNBs). LTE is accompanied by an evolution of non-radio aspects under System Architecture Evolution (SAE), which includes the Evolved Packet Core (EPC) network. LTE and SAE together comprise the Evolved Packet System (EPS).

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for facilitating ANR in a wireless telecommunication network environment is provided and includes initiating a fake (e.g., sham, bogus, mock) handover with a target Evolved Node B (eNB) in a Long Term Evolution (LTE) wireless network environment over an S1 interface with a mobility management entity (MME), receiving a handover command message from the MME comprising neighbor cell information associated with the target eNB, canceling the fake handover, and updating a neighbor relations table (NRT) with the neighbor cell information. As used herein, the term "handover" comprises a process (e.g., series of operations) used to hand over a user equipment (UE) from a source eNB to a target eNB.

As used herein, the term "neighbor cell information" includes eNB configuration information, such as bandwidth (e.g., bandwidth information can enable the eNBs to mitigate interference and compute load on neighboring cells based on reference signal received quality (RSRQ) measurements); target eNB reference signal power (e.g., for path-loss computation, detection of mobility, for example, to reduce unnecessary additional handover and macro cell detection); Physical Random Access Channel (PRACH) configuration information (e.g., parameters) of neighboring cells; and cell global identity (CGI) (e.g., for pre-Release 9 UEs), etc. associated with a specific eNB in the LTE network. Neighbor cell information can include eNB configuration information that is not transmitted between eNBs over an X2 interface. Other examples of neighbor cell information include common channel information, comprising system control information communicated in a broadcast control channel (BCCH), including downlink system bandwidth, antenna configuration, reference signal power, absolute radio-frequency channel numbers (ARFCNs), identity, configuration and available features of the eNB, etc. In a broad sense, any eNB configuration information carried in master information blocks (MIBs) and system information blocks (SIBs) in the LTE network and associated with a specific eNB may be included in neighbor cell information of the specific eNB.

Example Embodiments

Figure 1:
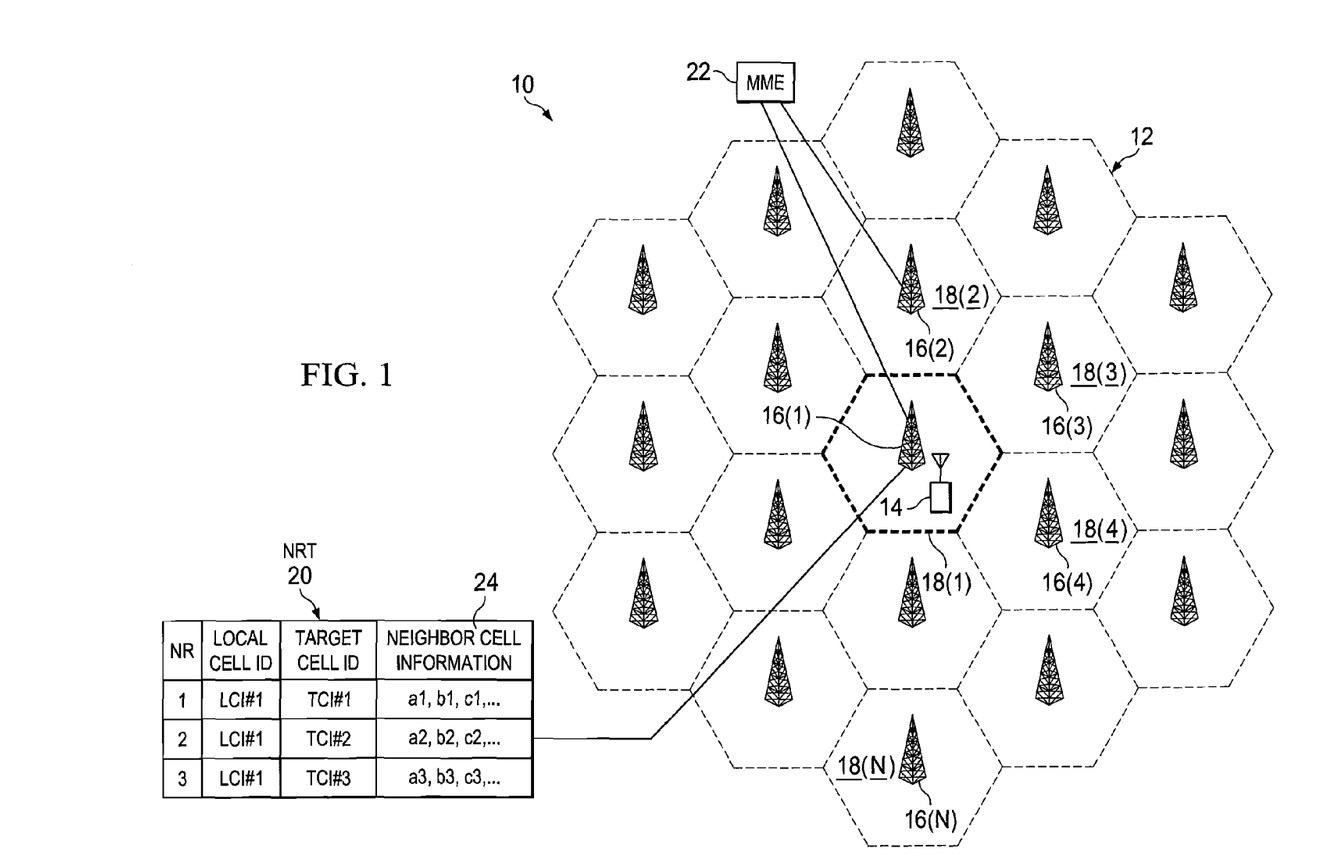
FIG. 1 is a simplified block diagram illustrating a communication system for facilitating ANR in a wireless telecommunication network environment.

Turning to FIG. 1, FIG. 1 is a simplified block diagram illustrating a communication system 10 for facilitating ANR in a wireless telecommunication network environment in accordance with one example embodiment. FIG. 1 illustrates a LTE network 12 comprising a UE 14 in wireless communication with an eNB 16(1) using LTE communication protocols. As UE 14 moves from one cell 18(1) to another cell 18(2) in network 12, UE 14 may stop communication with eNB 16(1) and commence communication with eNB 16(2) (servicing the target cell). Note that network 12 may include a plurality of cells 18(1)-18(2) (a cell (e.g., 18(1)) is a geographical area that can be identified by a UE (e.g., UE 14) from a (cell) identification that is broadcast from a UTRAN access point (e.g., executing at eNB 16(1))). Prior to handing over UE 14 to eNB 16(2), eNB 16(1) may discover and establish neighbor relations with eNBs 16(2)-16(N) using certain ANR protocols. Each eNB 16(1) ... 16(N) comprises a logical node responsible for radio transmission and/or reception in one or more cells to and/or from UE 14 (and other UEs in network 12).

According to various embodiments, eNB 16(1) may command UE 14 to report detected cells 18(1)-18(N) in the vicinity of UE 14. UE 14 may detect cells 18(1)-18(N) in its vicinity. The detected cells 18(1)-18(N) reported by UE 14 may or may not be present in a neighbor relation table (NRT) 20 maintained by eNB 16(1). For cells that are not present in NRT 20, eNB 16 may initiate ANR actions. Assume, merely for example purposes and not as a limitation, that cell 18(2) serviced by eNB 16(2) is not present in NRT 20. In some embodiments, eNB 16(1) may communicate with a Mobility Management Entity (MME) 22 over an S1 interface (i.e., interface used to communicate between eNB and MME), and fake a handover to the eNBs (e.g., 16(2)) corresponding to the missing cells. Based on the information received from the eNBs (e.g., 16(2)) during the fake handover, eNB 16(1) may populate NRT 20 appropriately. In various embodiments, eNB 16(1) may acquire neighbor cell information 24 associated with the eNBs (e.g., 16(2)) corresponding to the missing cells from the fake handover.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

In a cellular network environment, mobility management typically involves serving cell monitoring and evaluation, cell search and measurement reporting, and mobility decision and execution. The serving cell quality is monitored and evaluated on a periodic basis to sustain service quality over an acceptable threshold. If the service quality (e.g. in terms of received signal strength or energy consumption) falls below a policy-defined threshold, cell search and measurement reporting is triggered. The cell search and measuring procedure can be either network-configured or UE based depending on a radio interface standard, a current UE state (e.g. idle or connected), UE capabilities, and other factors. In both cases, a handover decision entity incorporates derived signal quality measurements (e.g., from the UE) to decide to move the UE to another cell, for example, based on various criteria including performance measures such as signal quality measures (e.g., received signal strength), user mobility measures (e.g. speed, direction, etc.), and the UE's energy consumption.

Self-organizing networks (SON) capability is a component of the LTE network. SON specifications are typically built over existing 3GPP network management architecture, reusing existing functionality without excessive disruption. Handling of neighbor relations between cells in radio networks includes continuous labor intense activities using existing radio technologies. Managing neighbor relations may be rendered more difficult in scenarios where multiple networks with several layers of cells are to be managed. Even with the best methods at hand, due to the sheer size of large radio networks (e.g., several hundred thousands of neighbor relations for a single operator), manual management of neighbor relations can be a gargantuan task. ANR is a SON feature that aims to automate management of neighbor relations. ANR seeks to remove, or at least minimize, manual handling of neighbor relations when establishing new eNBs and when optimizing neighbor lists. ANR can increase a number of successful handovers and lead to less dropped connections due to missing neighbor relations.

In a general sense, ANR according to 3GPP specifications allows automatic discovery and setup of neighbor relations when the UE moves from a serving eNB to another target eNB. ANR also automatically sets up a LTE unique X2 interface between eNBs, primarily used for handover. Note that the X2 interface is for direct communication between two eNBs. In ANR, the UE is ordered to report measurements to the serving eNB directly after a radio resource control (RRC) connection is set up (e.g., UE is attached to the cell) and continues to do so while staying in RRC connected mode. The UE is asked to report the measurements to the serving eNB soon after the RRC Connection setup and reports continuously until it is connected to the serving eNB. The serving eNB specifies the measurement criteria to the UE for triggering reporting of the neighboring eNB cells.

The UE measures Universal Mobile Telecommunications System (UMTS)/High Speed Packet Access (HSPA), Global System for Mobile Communications (GSM), Code division multiple access (CDMA) 2000 cells or any legacy networks based upon the capability of the UE. The UE reports all detected Physical Cell Identities (PCIS) (e.g., short identity of the LTE cell) that fulfill the measurement criteria set by the serving eNB at RRC connection. If there is an unknown cell included in the measurement report, ANR may trigger actions to make the cell known and potentially enable handover to the cell.

If the PCI reported by the UE does not correspond to any of the serving eNB's defined neighbor cells (i.e. it is not a neighbor cell), the ANR function in the serving eNB may request the UE to retrieve a Cell Global Identity (CGI) of the cell with the unknown PCI to identify the cell. The UE reads the CGI, which is broadcast by the target cell and reports it to the serving eNB. When the serving eNB receives the CGI, it can, with help from the MME, retrieve the target eNB's transport layer address (e.g., Internet Protocol (IP) address), which makes it possible for the serving eNB to contact the target eNB and establish a new communication interface (e.g., X2 interface). The serving and target eNBs are now in contact with each other and interface X2 can be setup between then.

The serving eNB requests X2 setup to the target eNB and includes cell data to create a neighbor relation (i.e. PCI, CGI, tracking area code (TAC), public land mobile network (PLMN) identifier (ID) and frequency) between the target cell and the serving cell. The target cell adds the serving cell to its neighbor list and the target eNB sends the corresponding data for the target cell (PCI, CGI, TAC, PLMN-id and frequency) to the serving cell, which in turn adds the target cell to its neighbor list in the NRT.

In some scenarios, the serving eNB can fetch broadcast information of the neighboring cell by performing a network scan. The network scan can be performed at the startup of the cell or when the cell is up and fully functional. However, the network scan has a few drawbacks. First, the network scan performed during startup may be able to fetch information about only those neighboring cells that lie within a preconfigured radius of the cell. Second, the network scan performed during the startup of the cell can fetch broadcast information of in-band neighboring cells (e.g., within a preconfigured frequency range) only. Third, the network scan performed during a fully functional state of the eNB cannot listen to in-band frequencies because of interference caused by the transmitter to the network listen receiver. In addition, the network scan cannot fetch information about the cells detected by the UE at the cell edge. Moreover, in-band continuous scanning poses difficulty due to proximity of the transmitter. Hence the network scanner would not be able to scan all the neighboring cells operating in the same frequency.

However, the ANR functions are not advanced enough to allow the serving eNB to obtain more detailed information about the neighboring cells. In some scenarios, the more detailed information can be fetched through a system information broadcasted by the cell. 3GPP has defined a way to mobilize system information to the serving eNB with the help of the UE (e.g., the eNB orders the UE to report the system information of any newly detected cells). The system information can help the serving eNB deduce many key parameters (e.g., path-loss) of its neighbors. However, the system information feature has been introduced only in Release 10 and hence UEs that follow Release 8 and Release 9 cannot utilize the system information feature to report the neighboring cells.

According to 3GPP specification, eNBs in general can transmit a maximum list of 16 cells for both intra- and inter-frequency in the neighborhood. The limited number of recipient cells may be insufficient to detect all the neighboring cells in an ad-hoc femto environment, with cell range of 10-30 meters and under macro environment. In addition, in case of ad-hoc femto deployments, establishing an X2 interface to all the neighboring eNBs may not be feasible (e.g., due to the sheer number of neighboring femto cells). An aggregator (e.g., home eNB (HeNB) Gateway) may be implemented to connect the HeNBs in the femto network. However, S1 signaling between the aggregator and eNBs may not support ANR functionality.

Communication system 10 is configured to address these issues (and others) in offering a system and method for facilitating automatic neighbor relation in a wireless telecommunication network environment. According to an embodiment of communication system 10, serving eNB 16(1) may initiate a fake handover with target eNB 16(2) over an S1 interface with MME 22. Serving eNB 16(1) may receive a handover command message from MME 22 comprising neighbor cell information 24 associated with target eNB 16(2). Serving eNB 16(1) may cancel the fake handover and update NRT 20 with neighbor cell information 24. Note that the handover is referred to as a "fake" handover to distinguish it from a normal handover, because the handover is not completed according to embodiments of communication system 10. Moreover, the purpose of initiating the handover is not to actually handover UE 14 to target eNB 16(2); rather, the purpose is to collect neighbor cell information 24 from target eNB 16(2).

According to various embodiments, serving eNB 16(1) may initiate a handover request to target cell served by eNB 16(2), despite a cell signal quality level at UE 14 not reaching a predetermined power threshold for a normal handover. Thus, serving eNB 16(1) may command UE 14 to generate the measurement report irrespective of whether the cell signal quality level is above or below the predetermined threshold for handover. The handover information shared by target cell 16(2) may be sniffed at eNB 16(1) to fetch detailed information comprising neighbor cell information 24 for advanced functions like UE path-loss, and cell global identity (CGI) capability. eNB 16(1) may command UE 14 to report detected cells in its vicinity. UE 14 may detect intra- and inter-frequency cells in its vicinity and report them to serving eNB 16(1) through appropriate RRC measurement report messages. UE 14 may only report cells that are not on a broadcast neighbor list (e.g., to reduce signaling overhead). In various embodiments, the UE reports may remain identical to reports with existing ANR implementations (e.g., according to 3GPP Releases 8 and 9).

Reports from UE 14 indicating an unknown cell can trigger various operations at source eNB 16(1). The detected cells as reported by UE 14 may or may not be present in NRT 20 at eNB 16(1). If at least one cell is not present in NRT 20, eNB 16(1) may seek more detailed information (e.g., common channel information broadcasted in a SIB) of that cell to populate neighbor cell information 24 corresponding to the missing cell in NRT 20. Using PCI and CGI, eNB 16(1) may fake a handover to the eNB (e.g., 16(2)) of the missing cell, as reported in the measurement report by UE 14. According to the fake handover, eNB 16(1) may initiate a handover, but may not complete it with target eNB 16(2). Serving eNB 16(1) may obtain neighbor cell information 24 of target eNB 16(2) through the fake handover process.

According to various embodiments, UE measurement based ANR can help serving eNB 16(1) detect neighbors. A limited set of information may be obtained over the X2 interface with the neighbors. More detailed information (e.g., Physical Random Access Channel (PRACH) configuration parameter) not exchanged via the X2 interface, and comprised in neighbor cell information 24, may be acquired using the fake handover procedure. In a general sense, it can be useful to know the PRACH parameters of neighboring cells in a distributed SON system, for example, to avoid choosing the same values and affecting RACH detection. Embodiments of communication system 10 can facilitate acquiring substantially all broadcast information from neighbor cells. The acquired information can be used to make intelligent decisions in setting appropriate parameters and avoiding interference.

In a general sense, neighbor cell information 24 at eNB 16(1) can be derived from multiple sources, including an operator configurable list comprising known cells in the eNB's frequency range; network listen procedure, which can facilitate fetching the neighbor cell topology in an ad-hoc network; cell bring up procedure, comprising a network listen feature commonly found in eNBs, and used to configure additional eNBs (both intra- and inter-frequency) that are not configured by the operator; and periodic and runtime sniffing (e.g., UE reported cells (both intra- and inter-frequency), and network listen (only inter-frequency)). According to various embodiments of communication system 10, neighbor cell information 24 can allow eNB 16(1) to accurately compute UE path-loss, and capture closed subscriber group (CSG) information associated with eNB 16(2) for Release 8 UEs, among other advantages.

Note that operations described herein with reference to embodiments of communication system 10 do not rely exclusively on X2 interfaces or communication, and can work effectively in the absence of any X2 interface. Moreover, although handshakes may be used to fetch missing ANR information through a proprietary interface or through 3GPP in future releases, embodiments of communication system 10 can facilitate backward compatibility and inter-operability in the eNBs within constraints of existing protocols. Because the neighbor cell information is exchanged over the S1 interface, no radio resources are consumed for ANR book keeping functionalities.

Embodiments of communication system 10 can be used in any suitable LTE network topology, including small cell environments. In a general sense, small cells can accommodate high density traffic areas such as urban areas, shopping malls, enterprise and campus areas, hotspots, etc. Small cells in general have much smaller cell coverage as compared to macrocells. Examples of small cells include picocells, femtocells, or microcells. In particular, in a femtocell network environment, eNBs 16(1)-16(N) comprise LTE femtonodes or Home evolved Node B (HeNB), which comprise short range low power cellular base stations that provide mobile broadband coverage, typically in indoor scenarios. Embodiments of communication system 10 can also be used in heterogeneous LTE networks, where cell size may vary from macro sizes to pico and femto sizes. For example, the size of a macrocell typically ranges from one to 20 kilometers, whereas the size of a picocell typically ranges from four to 200 meters.

Turning to the infrastructure of communication system 10, the LTE network can comprise a number of different types of network nodes and interfaces. The nodes include, for example, eNBs, MMEs, Home Subscriber Service (HSS), Serving Gateway (S-GW), and Packet Data Network Gateway (PDN-GW), among other network elements. The network elements (including in a core network) may communicate in any suitable network topology, which can include any number of servers, hardware accelerators, virtual machines, switches and routers, and other nodes inter-connected to form a large and complex network. A node may be any electronic device, client, server, peer, service, application, or other object capable of sending, receiving, or forwarding information over communications channels in a network. The various nodes may be coupled to other nodes through one or more interfaces employing any suitable wireless connection, which provides a viable pathway for electronic communications. Additionally, any one or more of these elements may be combined or removed from the architecture based on particular configuration needs.

Communication system 10 may be used in conjunction with a network that includes a configuration capable of TCP/IP communications for the electronic transmission or reception of data packets. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

The example network environment may be configured over a physical infrastructure that may include one or more networks and, further, may be configured in any form including, but not limited to, local area networks (LANs), wireless local area networks (WLANs), cellular networks, virtual local area networks (VLANs), metropolitan area networks (MANs), wide area networks (WANs), Intranet, Extranet, any other appropriate architecture or system, or any combination thereof that facilitates communications in a network. In some embodiments, a communication link may represent any electronic link supporting a wireless environment such as, for example, wireless technologies (e.g., IEEE 802.11x). In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

The techniques described herein may be used for various wireless communication networks such as Code division multiple access (CDMA), Time division multiple access (TDMA), Frequency Division Multiple Access (FDMA), Orthogonal Frequency-Division Multiple Access (OFDMA), Single Carrier Frequency-Division Multiple Access (SC-FDMA) and other networks. A CDMA network may implement a radio technology, such as UTRA, Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA.

A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP LTE and LTE-Advanced (LTE-A) are newer releases of the UMTS that use E-UTRA. UTRA, E-UTRA, UMTS, LTE, LTE-A and GSM are described in 3GPP documents. CDMA2000® and UMB are described in 3GPP2 documents. The techniques described herein may be used for the wireless networks and radio access technologies mentioned above, as well as other wireless networks and radio access technologies.

In various embodiments, measurement module 34 and handover module 36 comprise an application (e.g., in whole or in part) executing in a suitable network element, such as eNB 16(1)-16(N) in network 12 in communication system 10. As used herein, the term "network element" is meant to encompass eNBs, MMEs, computers, network appliances, fabric interconnect, servers, routers, switches, gateways, bridges, load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

In various embodiments, LTE network 12 can include an enterprise network, for example, a cellular network operating within an enterprise context. In other embodiments, LTE network 12 can include a wide area network, and other types of wireless networks. In various embodiments, MME 20 can include any type of suitable network elements configured to perform the handover operations and other 3GPP functionalities described herein.

In various embodiments, UE 14 may include any type of device capable of communicating with eNBs 16(1)-16(3), including smart phones, laptops, tablets, sensors, servers, and appliances. eNBs 16(1)-16(N) may comprise hardware connected to network 12 that communicates directly with UE 14, for example similar to a base transceiver station (BTS) in GSM networks, and are responsible for substantially all radio related functions (e.g., radio resource management, header compression, security, etc.). eNBs 16(1)-16(N) may embed its own control functionality, or may use a radio network controller within the broad scope of the embodiments. eNBs 16(1)-16(N) can include one or more chips (e.g., chipset) configured to provide mobile data transfer services according to LTE protocols. eNBs 16(1)-16(N) may be interconnected with each other and with other network elements by suitable interfaces (e.g., with each other by an interface known as "X2;" to MME 20 by a S1-MME interface; etc.). eNBs 16(1)-16(N) may manage one or more cells within cellular network 12. Note that the various communication for handover between eNBs 16(1)-16(N) described herein may occur over the S1 interface in specific embodiments.

Figure 2:
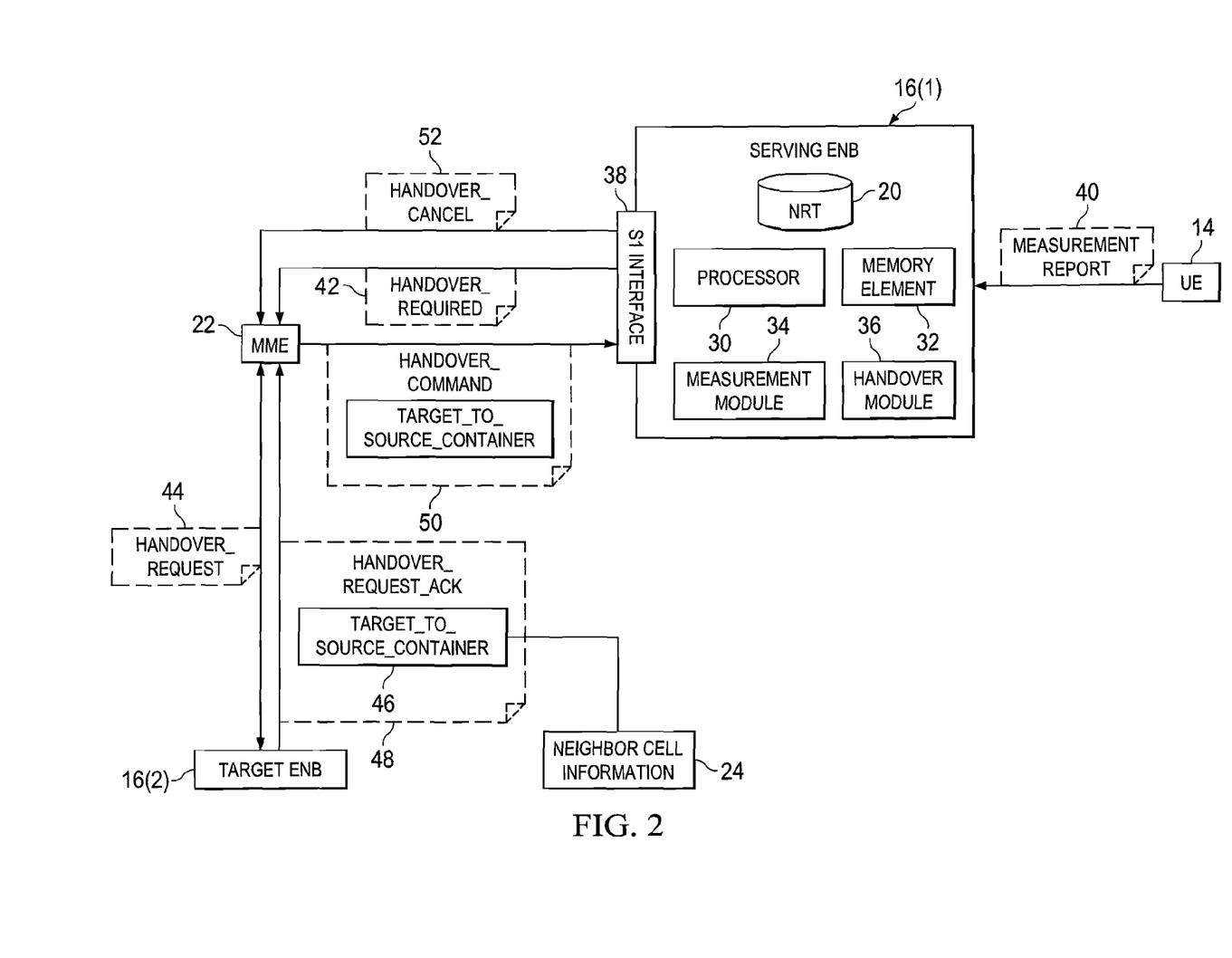
FIG. 2 is a simplified block diagram illustrating example details of an embodiment of the communication system.

Turning to FIG. 2, FIG. 2 is a simplified block diagram illustrating example details of an embodiment of communication system 10. Serving eNB 16(1) may include a processor 30, a memory element 32, NRT 20, a measurement module 34, a handover module 36, and an S1 interface 38. UE 14 may send a measurement report 40 to serving eNB 16(1), for example, at predetermined time intervals, or on command. Measurement module 34 may compare the list of neighbors included in measurement report 40 with entries in NRT 20. If an entry is found in measurement report 40 that is not present in NRT 20, ANR operations may be triggered according to the embodiments described herein.

Serving eNB 16(1) may initiate a Handover_Required S1 message 42 (e.g., over S1 interface 38) to MME 22. Handover_Required S1 message 42 may include a Source_To_Target_Container comprising a packet of information about UE capabilities and the serving eNB configuration towards UE 14. (A container is any software component that can include other components in itself). MME 22 may read Handover_Required S1 message 42, identify target eNB 16(2) and send a Handover_Request S1 message 44 to target eNB 16(2). The Source_To_Target_Container packet of information may be embedded in Handover_Request S1 Message 44.

Target eNB 16(2) may read Handover_Request S1 message 44 and based on various admission criteria, target eNB 16(2) may admit UE 14 on to the target cell. Target eNB 16(2) may prepare a Target_To_Source_Container 46, comprising broadcast common information (e.g., including SIBs, Radio Resource Common Information, and mobility control information) and allocated resources to newly admitted UE 14. Target_To_Source_Container 46 may include a complete or partial portion of the neighbor cell information 24 associated with eNB 16(2).

Target eNB 16(2) may encapsulate Target_To_Source_Container 46 in a Handover_Request_Acknowledge S1 message 48 to MME 22. MME 22 may read Handover_Request_Acknowledge S1 message 48, extract Target_To_Source_Container 46 and embed it in a Handover_Command S1 message 50 to eNB 16(1). Serving eNB 16(1) may extract Target_To_Source_Container 46 and relevant functions (e.g., Physical Downlink Shared Channel (PDSCH) configuration indicating a reference signal power) from Handover_Command S1 message 50 and populate NRT 20 appropriately. Serving eNB 16(1) may send a Handover_Cancel S1 message 52 to MME 22 to release any allocated resources at MME 22 and at target eNB 16(2). After the fake handover procedure, serving eNB 16(1) may retain a more detailed profile of neighbor eNB 16(2) (e.g., to facilitate advanced ANR functions) including neighbor cell information 24 in NRT 20.

Figure 3:
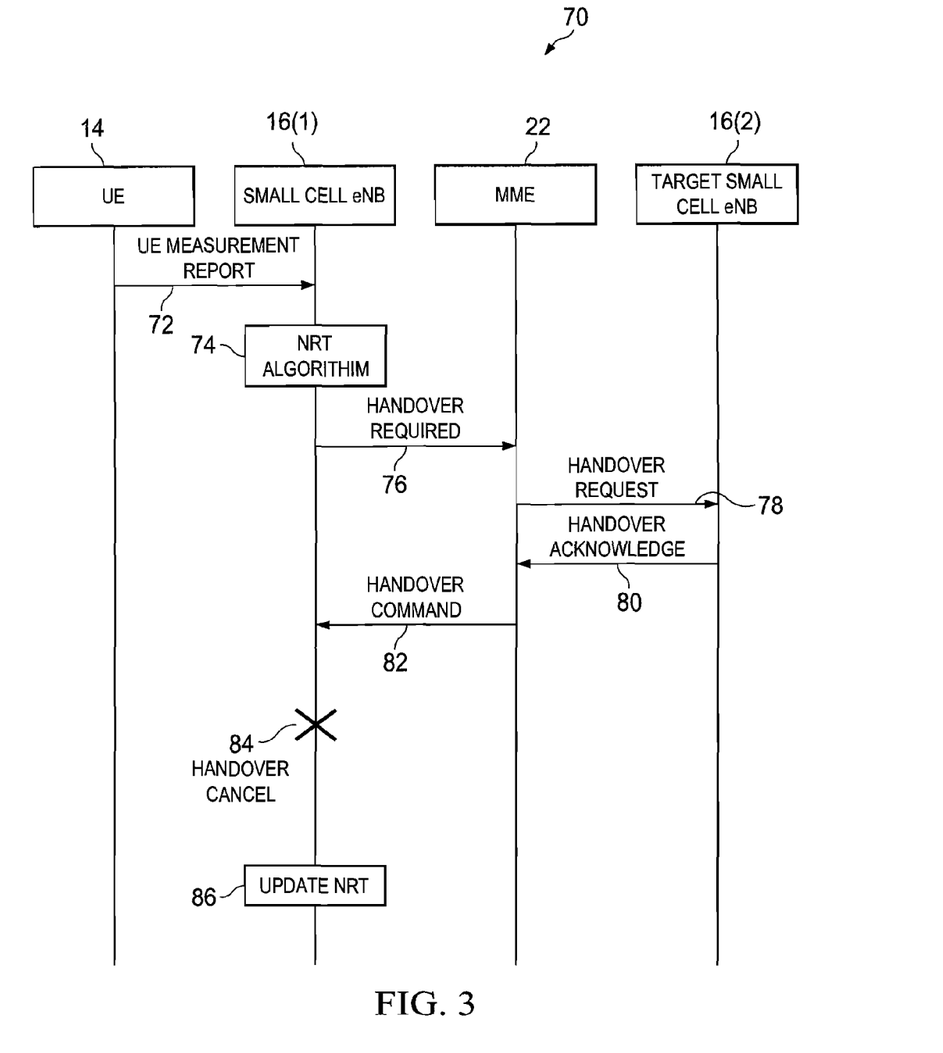
FIG. 3 is a simplified sequence diagram illustrating example operations that may be associated with an embodiment of the communication system.

Turning to FIG. 3, FIG. 3 is a simplified sequence diagram illustrating example operations 70 that may be associated with embodiments of communication system 10. At 72, UE 14 may send measurement report 40 to serving eNB 16(1). At 74, eNB 16(1) may execute an NRT algorithm, for example, to detect any missing entries in NRT 20. At 76, if a missing entry is detected, eNB 16(1) may send Handover_Required S1 message 42 to MME 22. At 78, MME 22 may send Handover_Request S1 message 44 to target eNB 16(2). At 80, Target eNB 16(2) may encapsulate Target_To_Source_Container 46 comprising neighbor cell information 24 in a Handover_Request_Acknowledge S1 message 48 to MME 22. At 82, MME 22 may send Handover_Command S1 message 50 including Target_To_Source_Container 46 to eNB 16(1). At 84, eNB 16(1) may cancel the handover and in some embodiments, may send Handover_Cancel S1 message 52 to MME 22. At 86, eNB 16(1) may update NRT 20 with neighbor cell information 24 of target eNB 16(2).

Figure 4:
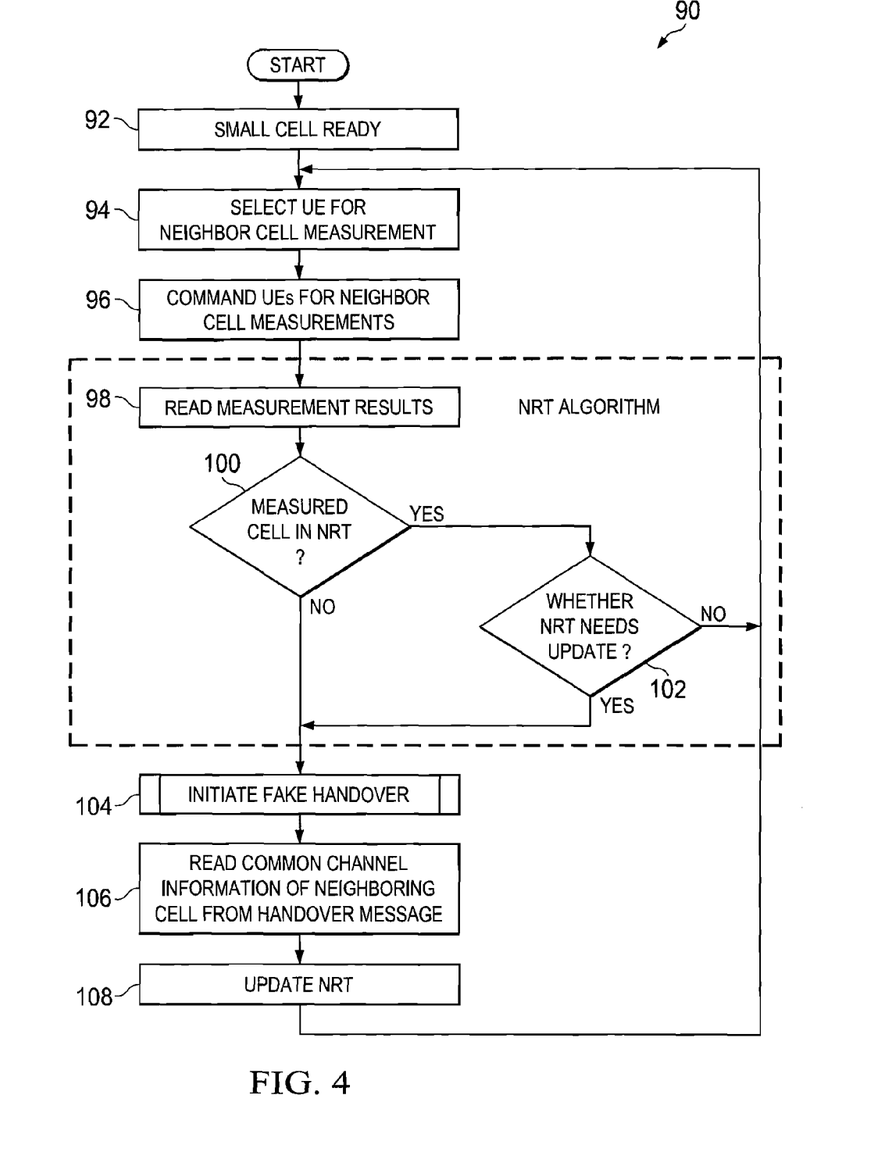
FIG. 4 is a simplified flow diagram illustrating other example operations that may be associated with an embodiment of the communication system.

Turning to FIG. 3, FIG. 3 is a simplified flow diagram illustrating example operations 90 that may be associated with embodiments of communication system 10. At 92, small cell eNB 16(1) may be ready to obtain neighbor information from UE 14. At 94, eNB 16(1) may select UE 14 for neighbor cell measurement. At 96, eNB 16(1) may command UE 14 for neighbor cell measurements. At 98, eNB 16(1) may read the measurement results (e.g., included in measurement report 40 from UE 14). At 100, a determination may be made whether the measured cell is present as an entry in NRT 20. At 102, if the measured cell is present as an entry in NRT 20, a further determination may be made whether NRT 20 is to be updated. If NRT 20 is not to be updated, the operations may revert back to 94 and continue thereafter.

If measured cell is not present in NRT 20 at 100, or NRT 20 is to be updated at 102 (in other words, the fake handover procedure may be initiated at 104. At 106, eNB 16(1) may read a common channel information of neighboring cell eNB 16(2) from the handover message (e.g., Handover_Command S1 message 50 including Target_To_Source_Container 46 that includes neighbor cell information 24). At 108, eNB 16(1) may update NRT 20 accordingly.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Note also that an 'application' as used herein this Specification, can be inclusive of an executable file comprising instructions that can be understood and processed on a computer, and may further include library modules loaded during execution, object files, system files, hardware logic, software logic, or any other executable modules. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, VIC adapter 22 and VIC host driver 26. In some embodiments, one or more of these features may be implemented in hardware, provided external to these elements, or consolidated in any appropriate manner to achieve the intended functionality. The various network elements (e.g., VIC adapter 22 and VIC host driver 26) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, the various network elements described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 32, NRT 20) can store data used for the operations described herein. This includes the memory element being able to store instructions (e.g., software, logic, code, data, etc.) in non-transitory media, such that the instructions are executed to carry out the activities described in this Specification. A processor can execute any type of instructions associated with the data to achieve the operations detailed herein in this Specification. In one example, processors (e.g., processor 30) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving, at a serving Evolved Node B (eNB) in a Long Term Evolution (LTE) wireless network environment, a measurement report comprising information about neighboring cells from a user equipment (UE), the information indicating at least one eNB that is not included in a neighbor relations table (NRT) at the serving eNB;
   designating, at the serving eNB, the at least one eNB as a target eNB for a handover;
   initiating, at the serving eNB, a fake handover with the target over an S1 interface with a mobility management entity (MME), wherein, unlike a normal handover, the fake handover is not intended to be completed at time of initiation, wherein the fake handover is initiated to collect neighbor cell information from the target eNB to populate the NRT;
   receiving, at the serving eNB, a handover command message from the MME comprising neighbor cell information associated with the target eNB;
   cancelling, at the serving eNB, the fake handover, irrespective of contents of neighbor cell information; and
   updating the NRT with the neighbor cell information;
   wherein the neighbor cell information comprises information, including eNB configuration associated with the target eNB that is not communicated over an X2 interface;
   wherein the neighbor cell information further comprises physical random access channel (PRACH) configuration parameters, bandwidth, target eNB reference signal power, and cell global identity (CGI) associated with the target eNB.

2. The method of claim 1, wherein the neighbor cell information comprises common channel information, including system control information communicated in a broadcast control channel (BCCH).

3. The method of claim 1, further comprising:
   determining whether any neighboring cell included in the measurement report is missing from the NRT.

4. The method of claim 3, further comprising commanding the UE to generate the measurement irrespective of whether a cell signal quality level is above or below a predetermined threshold for handover.

5. The method of claim 3, wherein the fake handover is initiated if the NRT is to be updated irrespective of any missing entries.

6. The method of claim 1, wherein the fake handover is initiated with a handover required S1 message over the S1 interface with the MME, wherein the MME sends a handover request S1 message to the target eNB, wherein the target eNB includes the neighbor cell information in a handover request acknowledge message to the MME, wherein the MME extracts the neighbor cell information from the handover request acknowledge message and includes the neighbor cell information in the handover command message.

7. The method of claim 6, wherein the target eNB includes the neighbor cell information in a target to source container, wherein the target to source container is encapsulated in the handover request acknowledge message.

8. The method of claim 1, wherein the fake handover is canceled with a handover cancel message to the MME over the S1 interface.

9. Non-transitory tangible media that includes instructions for execution, which when executed by a processor of a phone, is operable to perform operations comprising:
   receiving, at a serving eNB in a LTE wireless network environment, a measurement report comprising information about neighboring cells from a UE, the information indicating at least one eNB that is not included in a NRT at the serving eNB;
   designating, at the serving eNB, the at least one eNB as a target eNB for a handover;
   initiating, at the serving eNB, a fake handover with the target eNB over an S1 interface with a MME, wherein, unlike a normal handover, the fake handover is not intended to be completed at time of initiation, wherein the fake handover is initiated to collect neighbor cell information from the target eNB to populate the NRT;
   receiving, at the serving eNB, a handover command message from the MME comprising neighbor cell information associated with the target eNB;
   canceling, at the serving eNB, the fake handover, irrespective of contents of neighbor cell information; and
   updating the NRT with the neighbor cell information;
   wherein the neighbor cell information comprises information, including eNB configuration associated with the target eNB that is not communicated over an X2 interface;
   wherein the neighbor cell information further comprises physical random access channel (PRACH) configuration parameters, bandwidth, target eNB reference signal power, and cell global identity (CGI) associated with the target eNB.

10. The media of claim 9, wherein the neighbor cell information comprises common channel information, including system control information communicated in a BCCH.

11. The media of claim 9, the operations further comprising:
   determining whether any neighboring cell included in the measurement report is missing from the NRT.

12. The media of claim 9, wherein the fake handover is initiated with a handover required S1 message over the S1 interface with the MME, wherein the MME sends a handover request S1 message to the target eNB, wherein the target eNB includes the neighbor cell information in a handover request acknowledge message to the MME, wherein the MME extracts the neighbor cell information from the handover request acknowledge message and includes the neighbor cell information in the handover command message.

13. An apparatus in a LTE wireless network environment, comprising:
   a memory element for storing data, including a NRT; and
   a processor, wherein the processor executes instructions associated with the data, wherein the processor and the memory element cooperate, such that the apparatus is configured for:
   receiving, at the apparatus, a measurement report comprising information about neighboring cells from a UE, the information indicating at least one eNB that is not included in the NRT;
   designating, at the apparatus, the at least one eNB as a target eNB for a handover;
   initiating, at the apparatus, a fake handover with the target eNB over an S1 interface with a MME, wherein, unlike a normal handover, the fake handover is not intended to be completed at time of initiation, wherein the fake handover is initiated to collect neighbor cell information from the target eNB to populate the NRT;
   receiving, at the apparatus, a handover command message from the MME comprising neighbor cell information associated with the target eNB;
   cancelling, at the apparatus, the fake handover, irrespective of contents of neighbor cell information; and
   updating NRT with the neighbor cell information;
   wherein the neighbor cell information comprises information, including eNB configuration associated with the target eNB that is not communicated over an X2 interface;
   wherein the neighbor cell information further comprises physical random access channel (PRACH) configuration parameters, bandwidth, target eNB reference signal power, and cell global identity (CGI) associated with the target eNB.

14. The apparatus of claim 13, wherein the neighbor cell information comprises common channel information, including system control information communicated in a BCCH.

15. The apparatus of claim 13, further configured for:
   determining whether any neighboring cell included in the measurement report is missing from the NRT.

16. The apparatus of claim 13, wherein the fake handover is initiated with a handover required S1 message over the S1 interface with the MME, wherein the MME sends a handover request S1 message to the target eNB, wherein the target eNB includes the neighbor cell information in a handover request acknowledge message to the MME, wherein the MME extracts the neighbor cell information from the handover request acknowledge message and includes the neighbor cell information in the handover command message.

* * * * *